United States Patent Office

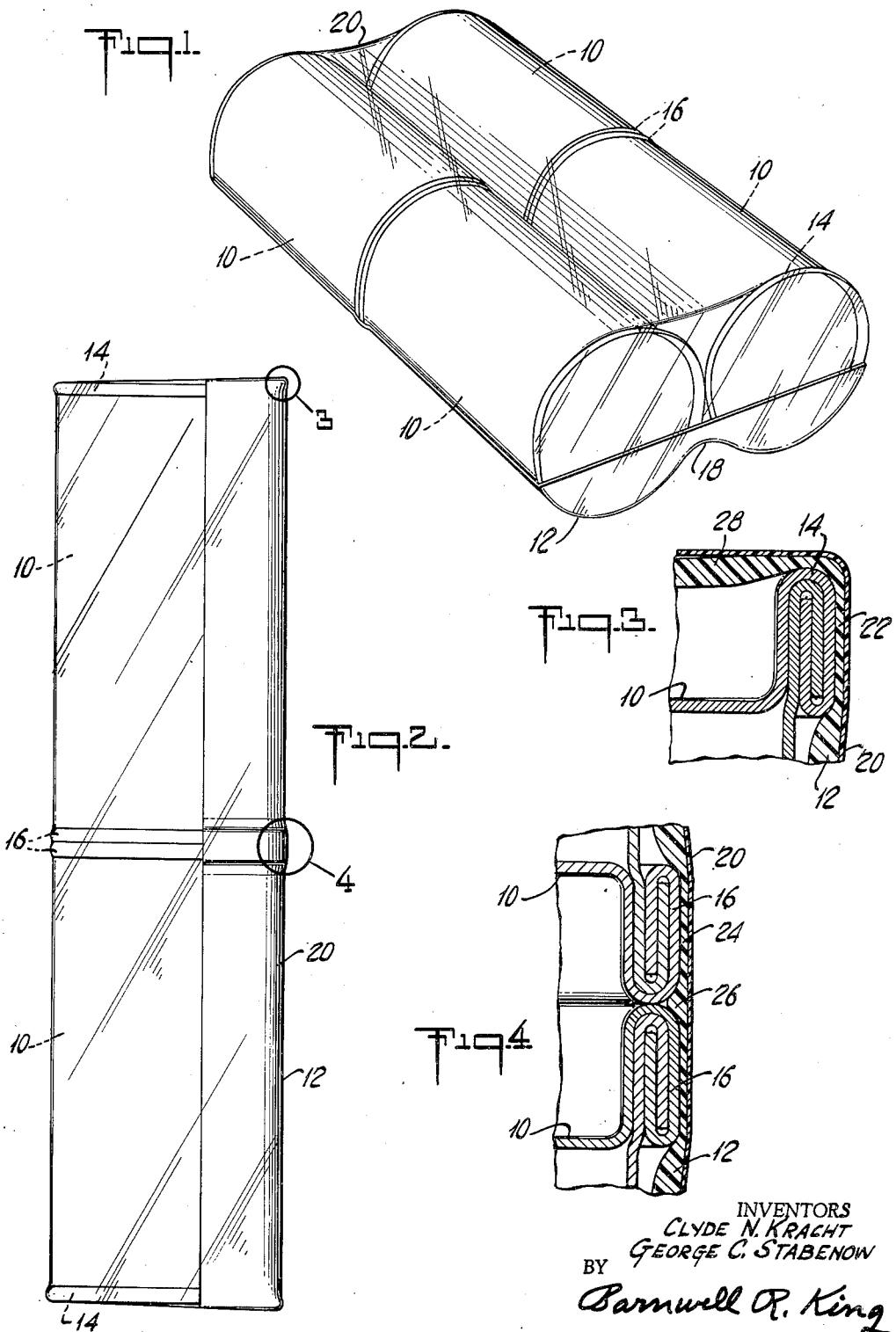

3,255,877
Patented June 14, 1966

3,255,877
PLASTIC PACKAGING
Clyde N. Kracht, Darien, Conn., and George C. Stabenow, Hinsdale, Ill., assignors to Union Carbide Corporation, a corporation of New York
Filed June 7, 1962, Ser. No. 200,753
4 Claims. (Cl. 206—65)

This invention relates to packaging and more particularly to the formation of packages in which the contents are wrapped tightly in a transparent film of plastic.

The invention provides a package consisting of a semi-rigid pallet of biaxially oriented cellular thermoplastic sheet material having the shape of the lower portion of the contents of such package for nesting and supporting such contents in a predetermined arrangement, and a transparent envelope of biaxially oriented transparent thermoplastic film surrounding and binding such contents and pallet together as a unit.

According to the invention there is provided a method of forming a package having a wrapper of transparent protective film smoothly embracing the upper portion of the contents of such package, which comprises heat-preforming a pallet of biaxially oriented thermoplastic sheet material to correspond to the shape of the lower portion of such contents to provide a nest therefor, by molding such material with the aid of heat sufficient only to partially shrink such material. Such contents are nested in such pallet and the pallet and so-nested contents are enclosed in an envelope of biaxially oriented thermoplastic film, so that such film surrounds both the pallet and contents in fitting relation. Finally the film and pallet are subjected to heat sufficient to shrink both of them tightly about such contents in firmly embracing and unitizing relationship.

The invention particularly provides for tightly wrapping into a transparent plastic overwrap, an elongated bundle of similar or diverse articles. Such articles are nested in a preformed support of heat-shrinkable cellular plastic sheet. Such support and the so-nested articles are provided with an overwrap of heat-shrinkable thermoplastic film; and concurrent heat-shrinking of the support and overwrap are accomplished to form a durable bundle of tightly interlocked items.

More particularly, the invention provides a stiff, durable "multipack" of a plurality of uniform or ununiform loose items, placed into an orderly, extensive arrangement. It has been used, for example, in making a rigid "four-count pack" of uniform cans of fruit juices into a one-long, two-wide and two-high arrangement.

The method may also be used to great advantage, to bundle, support and protect ununiform and/or fragile items, such as "fingers" or "bunches" (approximately two pounds) of bananas, thereby reducing or eliminating bruises and scarring of fruit removed from the stalk at the plantation and there packaged for shipment to the customer.

The reasons for using a "multipack" in some merchandising operations generally involves the extra convenience for the shopper including:

(1) Easy carrying of several units.
(2) Greater variety—products in different flavors and sizes can be sampled and well-known favorites can help the introduction of brand new products.
(3) Simplified shopping—Multipacks are excellent means of combining different products that go together naturally, such as canned fruit and a pie mix.

It is desirable to have multipacks of long, narrow cans, such as those used for concentrated fruit juices, arranged into a vertical stack. Such a vertical multiplack of four cans is more readily racked on the retail store shelves to achieve the desired effective display of brand name.

Previous methods of packaging multipacks in vertical arrangement were not entirely satisfactory. They used paperboard support pallets, die cut and folded to separate the chines (beads) of mating cans, and were curved partly about the can bodies to support them. It was difficult to assemble and align cans on such folded paperboard pallets and maintain them in alignment during insertion into the overwrap film sleeve. Previous methods did not prevent misalignment of the cans in end-to-end arrangement after shrinking the sleeve overwrap about the can items and paperboard pallet, nor did they provide a rigid enough package to support a plurality of elongate items.

Such problems and difficulties are avoided by the present invention in which, for example, a preformed pallet of biaxially oriented cellular plastic such as polystyrene, polyurethane or polypropylene sheet, is preshaped in a partial shrinking operaion (about ⅓ to ½ total shrink) to conform generally to the desired bundling arrangement of items. This provides the necessary strength and rigidity for a rigid, durable package when it is ultimately, concurrently shrunk about the product items in combination with a heat-shrinkable overwrap of biaxially oriented polypropylene film.

The preformed pallet is preferably made of cellular plastic sheeting, so that it can be partially heat-shrunk and compressed to a shape approximating that of the items constituting the contents, thereby permitting the items to be readily nested therein for easy insertion into the film wrapper. In the final heat-shrink operation, the film wrapper and pallet are concurrently shrunk and tightly drawn down about the items, thereby compressing, compacting and interlocking the cellular sheet pallet about protruding surfaces of the items to immobilize them, one to the other. The film overwrap binds the items and pallet together into a durable multipack with a perimeter seal.

In the case of a multipack of "loose fingers" or a connected "bunch" or "cluster" of bananas, former packaging did not prevent shifting or bruising the fruit. A preformed pallet of biaxially oriented foamed polystyrene sheet, generally shaped to the number and configuration of bananas involved and made to interlock the unit fruit "fingers," according to the invention, provides the necessary support for a strong, rigid package when concurrently heat-shrunk in combination with a heat-shrinkable overwrap of biaxially oriented polypropylene film.

The main object of the invention is to provide a method for making a multipack with a transparent overwrap film which results in a strong, rigid, durable unit package for a plurality of product items that are arranged into an elongate bundle.

Another object is to provide an elongate package article that can be stacked vertically and have a surface that is transparent, to display the contents and to reveal the pallet. It is also desirable that the outer surface of the pallet can be used as a printing surface for promotional advertising, etc.

Other objects are to advance the art by improving the packaging of such items so that they are protected, yet displayed with attractive effect.

The invention involves:

(1) Making a preformed pallet of shrinkable cellular plastic sheet which is only partially shrunk to a shape that cradles the product items to be packaged into the preferred arrangement.
(2) Placing such product items in such preformed pallet.
(3) Inserting the pallet and product items into a shrinkable film sleeve of appropriate circumference and length.
(4) Concurrently heat-shrinking the pallet and film sleeve tightly about the periphery of the preferred arrangement of the product items, to interlock them into a durable package.

In the drawing:

FIG. 1 is a perspective view of a package illustrating the invention;

FIG. 2 is a view in side elevation of such package; and

FIGS. 3 and 4 are enlarged fragmentary cross-sections of the package taken in the zones 3 and 4, respectively of FIG. 2.

As shown in such drawing, four cans of fruit juice concentrate 10 or similar elongate items are vertically stacked (end-to-end) to obtain the desired commercial display value. A 6" x 10" sheet of .025" thick biaxially oriented cellular polystyrene of 14 pounds per cubic feet density, with a gloss surface, is preformed into a suitable pallet 12 by pressing it down about a half-section template of the desired can arrangement, and simultaneously heat-shrinking it to approximately 25 to 33 percent of final shrink. The cellular sheet is thereby shaped into the pallet 12 about the end beads 14 and mating beads 16 of the can arrangement and into the open V-groove 18 between the curved surfaces of the cam items.

The four can items 10, each 2 3/16" diameter by 3 7/8" long, are nested into the preformed pallet 12 and the assembly is inserted into a 11" long sleeve 20, of 6" flat width seamless tubing made of .001" thick biaxially oriented polypropylene films. In the preferred method, a perimeter seal is made in the overwrap film by hot-wire sealing the ends of the film sleeve. However, if desired, the sleeve ends may be left open for the next step.

The assembly of pallet 12, cans 10 and the overwrap sleeve 20 is then concurrently heat-shrunk with the bottom (preformed pallet side) up, in a heated air chamber, at a temperature of about 135° C., for about 1½ minutes. The heated air concurrently shrinks the film overwrap 20 and pallet 12, drawing the pallet down tightly about the items, and compacting the cellular sheet at the corners and protuberances to form a rigid, durable bundle.

Compacting of the cellular plastic pallet 12 about the can beads 14 and 16 is caused by the tension in the film overwrap 20 as it is heat-shrunk concurrently with the pallet. The compressible cellular plastic sheet of the pallet is compacted by the film overwrap about the corners and beads of the package, as at 22 and 24, to about less than one-third of its original thickness. Where the compressible sheet bridges the beads or corners, as at 28 and 26, it blends from the original thickness to the compacted thickness and thereby serves to immobilize and interlock the can items together.

The compressible pallet preform may be made of any cellular plastic material, such as .020" to .040" thick, smooth-surfaced sheets of foamed polystyrene, polypropylene or polyurethane, which is capable of being heat-shrunk to less than about 85 percent of its original area and can be compacted by the pressure of a heat-shrunk overwrap film to a thickness not less than about 35 percent of its original thickness. The overwrap film is preferably made of biaxially oriented polypropylene of about .001" thickness. However, any plastic film which has the acceptable clarity and may be heat-shrunk to less than 80 percent of its original area, and is capable of providing a heat-seal strength of 5 to 10 pounds per inch length, would be satisfactory in combination with the above-disclosed pallet to practice the method of this invention.

What is claimed is:

1. A package having a plurality of contents in which at least some of the adjacent contents have separate surfaces at their lower portion comprising, a semi-rigid pallet of bioriented cellular thermoplastic sheet material having the shape of the lower portion of said contents and extending at least partially between said separated surfaces for nesting and supporting said contents in a predetermined arrangement and an envelope of bioriented transparent thermoplastic film surrounding and binding said contents and pallet together as a unit.

2. A package for cans stacked in side-by-side relationship, consisting of a pallet of thermoplastic cellular sheet material shaped to nest each of such cans in such arrangement, said pallet substantially covering one face of the stacks of said cans and extending part way between the adjacent stacks thereof and a tension member entirely surrounding both said pallet and the so-arranged cans nested therein, said tension member consisting of biaxially oriented film of thermoplastic material which binds said pallet and such cans as a unit.

3. The package of claim 2 wherein said pallet extends at least partially over the exposed ends of said cans.

4. A package comprising a plurality of cylindrical cans of substantially equal size, said cans having outwardly extending flanges, said cans being disposed side-by-side in rows of axially aligned pairs having the adjacent end faces of each pair in abutting relationship, the end flanges of each can of each pair of cans being laterally aligned with the flanges of the next adjacent pair of cans, a pallet contoured to nest each of said pairs composed of foamed heat-shrunk thermoplastic, and an envelope of thermoplastic heat shrunk biaxially oriented polyolefin film sealing, confining, and unifying said cans and pallet in a complete package.

References Cited by the Examiner
UNITED STATES PATENTS

| | | | |
|---|---|---|---|
| 2,912,103 | 11/1959 | Hennessey et al. | 206—65 |
| 2,996,180 | 8/1961 | Bruce. | |
| 3,046,711 | 7/1962 | Harrison | 53—30 |
| 3,071,906 | 1/1963 | Zebarth et al. | 53—30 |
| 3,083,825 | 4/1963 | Larsen | 206—65 |

JOSEPH R. LECLAIR, *Primary Examiner.*

EARLE J. DRUMMOND, FRANKLIN T. GARRETT, GEORGE O. RALSTON, *Examiners.*

R. PESHOCK, *Assistant Examiner.*